(12) United States Patent
Dainese et al.

(10) Patent No.: US 8,608,191 B2
(45) Date of Patent: *Dec. 17, 2013

(54) PROTECTION DEVICE INCLUDING AN INFLATABLE MEMBER

(75) Inventors: Lino Dainese, Molvena (IT); Luigi Ronco, Molvena (IT)

(73) Assignee: Dainese S.p.A., Molvena Vi (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/133,437

(22) PCT Filed: Dec. 4, 2009

(86) PCT No.: PCT/IB2009/055507
§ 371 (c)(1),
(2), (4) Date: Sep. 21, 2011

(87) PCT Pub. No.: WO2010/067285
PCT Pub. Date: Jun. 17, 2010

(65) Prior Publication Data
US 2012/0007344 A1    Jan. 12, 2012

(30) Foreign Application Priority Data

Dec. 9, 2008  (IT) .............................. RM2008A0656
May 29, 2009 (IT) .............................. VR2009A0078

(51) Int. Cl.
*B60R 21/231*    (2011.01)
*B60R 21/2334*   (2011.01)
*B60R 21/207*    (2006.01)
*B60R 21/213*    (2011.01)

(52) U.S. Cl.
USPC .................. 280/730.1; 280/730.2; 280/743.1; 280/743.2

(58) Field of Classification Search
CPC .. B60R 21/213; B60R 21/214; B60R 21/231; B60R 21/23138; B60R 21/232; B60R 21/235; B60R 2021/23192; B60R 2021/2338; B60R 2021/23382; B60R 2021/23514; B60R 2021/23566; B60R 2021/23571; B60R 2021/23576; B60R 2021/2358; B60R 2021/23592
USPC ...................... 280/730.1, 730.2, 743.1, 743.2
See application file for complete search history.

(56) References Cited

U.S. PATENT DOCUMENTS 6,585,293 B2 *  7/2003  Keshavaraj ................ 280/743.1
6,734,125 B2 *  5/2004  Veiga ......................... 442/203

(Continued)

FOREIGN PATENT DOCUMENTS

GB    2391840 A  *  2/2004

OTHER PUBLICATIONS

Superficial Definition, Merriam-Webster's Online Dictionary, available at, http://www.merriam-webster.com/dictionary/superficial (last visited on Feb. 25, 2013).*

(Continued)

*Primary Examiner* — Joseph Rocca
(74) *Attorney, Agent, or Firm* — Steinfl & Bruno, LLP

(57) ABSTRACT

A protection device comprising an inflatable member and one or more structures is described. The inflatable member comprises a first wall and a second wall that form an internal chamber. The one or more structures are housed in the internal chamber, and each structure in the one or more structures comprises a first mesh and a second mesh connected by a plurality of tie members. Methods for manufacturing such a protection device are also described.

20 Claims, 17 Drawing Sheets

(56) References Cited

U.S. PATENT DOCUMENTS

| | | | |
|---|---|---|---|
| 6,753,275 B2* | 6/2004 | Veiga | 442/164 |
| 7,651,118 B1* | 1/2010 | Veiga | 280/728.1 |
| 2004/0029468 A1* | 2/2004 | Kim et al. | 442/76 |
| 2004/0061316 A1* | 4/2004 | Elqadah et al. | 280/730.2 |
| 2005/0098995 A1* | 5/2005 | Fischer | 280/743.2 |
| 2006/0292950 A1* | 12/2006 | Hill | 442/76 |
| 2007/0040368 A1* | 2/2007 | Manley | 280/743.2 |
| 2012/0011642 A1* | 1/2012 | Dainese et al. | 2/455 |
| 2012/0032422 A1* | 2/2012 | Dainese et al. | 280/728.1 |

OTHER PUBLICATIONS

Mesh Definition, Merriam-Webster's Online Dictionary, available at, http://www.merriam-webster.com/dictionary/mesh (last visited Feb. 26, 2013).*

Weave Definition, Merriam-Webster's Online Dictionary, available at, http://www.merriam-webster.com/dictionary/weave (last visited Feb. 28, 2013).*

Weave Definition, Merriam-Webster's Online Dictionary, available at, http://www.merriam-webster.com/dictionary/woven (last visited Feb. 28, 2013).*

Side curtain Airbag Volkswagen Touran Images. Nov. 24, 2006.

* cited by examiner

PROTECTION DEVICE INCLUDING AN INFLATABLE MEMBER

CROSS REFERENCE TO RELATED APPLICATIONS

The present application is the US national stage of International Application PCT/IB2009/055507 filed on Dec. 4, 2009, which, in turn, claims priority to Italian Patent Application RM2008A000656 filed on Dec. 9, 2008, and to Italian Patent Application VR2009A000078 filed on May 29, 2009, both of which are incorporated herein by reference in their entirety. The present application may be related to International Applications PCT/IB2009/055512, filed on Dec. 4, 2009; PCT/IT2009/000547, filed on Dec. 4, 2009; and PCT/IB2009/055516, filed on Dec. 4, 2009.

The present disclosure refers to a protection device which is adapted to be associated to a vehicle for protecting a user or a passenger from impacts against a vehicle or portions of the vehicle in case of road accident.

The present disclosure also relates to a vehicle including said protection device. In the last years, as a result of a constant research in vehicle driving safety, a plurality of protection devices have been contrived for a user aboard the vehicle, to protect the user from impacts against parts of the vehicle.

A convenient solution is, e.g., that of a protection device including an inflatable member or inflatable bag which, in a resting condition, is arranged deflated and folded in a housing of the vehicle, at vehicle parts potentially concerned by impacts, i.e., against which, in case of accident, the user can come in contact.

Moreover, the inflatable bag is set in fluid communication, at the instant of an impact, a slipping or a road accident in general, with a source of compressed gas, like a canister. Generally, the gas source is adapted to introduce a preset amount of compressed gas such as to set the inflatable member in an inflated, therefore tensioned condition, to form an inflated case of somewhat round shape, similar to a balloon. Therefore, the amount of gas introduced is strictly correlated to the volume of the inflatable bag in order to guarantee a satisfactory inflation.

Essentially, these bags in an inflated condition form a sort of balloon, rather bulky and with a wide cross section, which balloon interposes, in an inflated condition, between the user and the vehicle portion.

A need stemming from the use of said inflatable bag is that of guaranteeing an effective specific protection for the user in connection to a corresponding vehicle part to which the inflatable bag is associated.

It follows that, to offer a maximum protection, it is convenient to place said sort of inflated balloon in each zone of interest of the vehicle, that is in zone of possible impact with the user. However, such a need entails the use of a high number of inflatable bags and a high number of sources of compressed gas, or in general of pressurized fluid.

A technical problem at the basis of the present disclosure lies in providing a protection device suitable for a vehicle, allowing to overcome the drawbacks mentioned above with reference to the known art and/or to achieve further advantages; in particular, a technical problem lies in providing a protection device comprising an inflatable member whose shape be controllable a priori and designed so that the protection device may be as much as possible suitable for the part/s of the vehicle to which it is associated. Moreover, a technical problem at the basis of the present disclosure lies in providing a vehicle including said protection device. Such a technical problem is solved by a protection device for the protection of a vehicle user, as defined in independent claim 1, by a vehicle according to claim 21, and by a manufacturing method according to claim 22.

Secondary features of the subject of the present invention are defined in the corresponding dependent claims thereof.

By the term "mesh" it is meant, within the scope of the present disclosure, a patch or cloth, which is porous and/or has the likeness of a mesh.

By the term "wall" or "sheet" it is meant, within the scope of the present disclosure, a covering member for a respective mesh, wherein the first and the second wall are perimetrically associated so as to define a chamber inside which the first and second mesh, which are connected therebetween, are arranged.

An aspect of the present disclosure relates to a case including two opposite walls or sheets and a textile structure, which in turn includes a first mesh, a second mesh and tie members having each opposite ends fixed respectively to the first mesh and to the second mesh; inside said case, each mesh is associated adherent to the respective wall.

The subject of the present disclosure provides several relevant advantages.

A first advantage consists in the fact that the inflatable member, comprising said case, may be manufactured so that in an inflated condition it has any desirable shape and size; in fact, it is possible to arrange in the internal chamber the structure including the two meshes, adjusting a priori the length of the tie members, so that the tie members have a condition of maximum tension and/or maximum extension corresponding point for point to the desired distance between meshes when the inflatable member is inflated. In practice, the shape and size of the inflatable member can be controlled and set a priori, since the maximum expansion of the inflatable member can be controlled by a suitable selection at the design stage of the length and the maximum extension of the tie members.

Therefore, by suitably shaping the textile structure or body including the two meshes with the tie members, and optionally providing different lengths for the tie members according to their location in the wall-defined chamber, it is possible to determine a priori the shape assumed by the inflatable member in an inflated condition (both in terms of distance between the two meshes and in terms of perimetral shape of the two meshes).

Moreover, controlling the shape of the inflatable member by the tie members, it is possible to direct or subdue the direction of the flow of fluid that is inlet inside the chamber during a step of inflating the inflatable member. In fact, by suitably calibrating the length of the tie members, it is possible to inflate, by a single source of fluid, an inflatable member having an articulated or complex shape, e.g. with numerous branches and appendages. In other words, it is possible to obtain inflatable members of any shape, profile or outline.

The inflatable member, in an inflated condition, is intended to interpose between a user and the vehicle, or a portion of the vehicle, so as to absorb the energy of the impact between the user and the vehicle and avoid as much as possible that, in case of road accident, the user be subject to lesions as a consequence of a violent impact against the vehicle or its portions. In the present disclosure, by "vehicle" it is meant any means of transport, even for sporting use. Casewise, the user may e.g. be a motorcyclist, a pilot, a driver, a passenger.

In particular, thanks also to the possibility of obtaining an inflatable member of any shape, profile or outline, the inflatable member may be manufactured so as to at least partially encircle the user and/or arrange about the user in an inflated condition.

Moreover, thanks to the shape control, the inflatable member can easily be coupled to other protection devices or members independent of the inflatable member, and having a shape conjugated to that of the inflatable member in an inflated condition. For instance, by utilizing tie members having the same length, it is possible to manufacture an inflatable member having a flattened, plate-shaped, mat-like shape, which can be easily coupled to a flat member, like, e.g., a rigid plate, which can be interposed between the vehicle and the protection device so as to provide additional protection against sharp objects.

According to another aspect of the present disclosure, the tie members guarantee a limited expansion of the inflatable member in an inflated condition so as to obtain a reduced encumbrance, and in particular a limited thickness, concomitantly ensuring an adequate protection for a user.

Such a reduced encumbrance allows, in case of fortuitous inflation of the inflatable member, a lesser discomfort and risk for a user while he/she drives a vehicle. In other words, a limited expansion of the inflatable member does not prejudice the control of a vehicle by the user, and therefore in case of a fortuitous inflation does not constitute a risk of accident.

An adequate protection is also due to the fact that the personal protection device has a satisfactory resistance to localized impacts or overpressures. In fact, should one of the tie members break, the breaking of a single tie member would not prejudice the desired limitation of the expansion of the inflatable member, such a limitation being anyhow ensured by the other tie members.

A further advantage lies in the fact that by controlling the shape of the inflatable member it is possible to control (and in particular to limit) also the amount of gas or fluid needed for inflation of the inflatable member.

A further advantage lies in the fact that the tie members, by being stably connected to the meshes, offer a high strength even in case of local pressures due to knocks at the instant of an impact or of a fall. In fact, a local pressure is redistributed over a wider surface of inflatable member thanks to the plurality of tie members cooperating thereamong.

A further advantage lies in a high manufacturing simplicity of the device, since a preferably prefabricated structure including the two meshes is housed between the two opposed walls, which are then sealed along the perimeter; this method (process) does not require particularly complex manufacturing steps or complex equipment.

Moreover, it is found that the protection device according to the present disclosure can be inflated over very rapid times, of the order of milliseconds (ms), and even more particularly between 10 and 500 ms, preferably between 10 and 200 ms, even more preferably to reach overpressures comprised between 0.5 and 3 bar.

In this connection, in one embodiment, the personal protection device includes means for actuating and/or means for inflating the inflatable member, i.e., one or more sensors capable of detecting an unforeseen dangerous event (e.g., a road accident, an impact, a slipping), a source of inflating fluid and/or valves capable of connecting the internal chamber of the inflatable member with a source of inflating fluid.

The source of inflating fluid preferably comprises a generator of cold gas, like e.g. Helium, i.e. a container in which gas is held at a high pressure. An advantage of utilizing a cold gas generator lies in the fact that gas cools down as it diffuses in the inflatable member, and cools down any residual gases present inside the inflatable member, fostering the keeping of the inflatable member in an inflated condition.

There is also the possibility of utilizing inside the same chamber a plurality of structures each including the two meshes and, optionally, having tie members of different lengths, so as to obtain a differentiated expansion of the inflatable member at different parts of the inflatable member itself. Said plural structures are connected thereamong prior to being inserted in the chamber formed by the walls.

In a preferred embodiment, the tie members are of flexible type, and therefore can be flexed or tensioned when required, depending on inflatable member inflation.

Preferably, the tie members are suitably sized so that when the inflatable member is in a resting deflated condition they are in a non-tensioned condition, preferably collapsed in said internal chamber, whereas when the inflatable member is in an inflated condition they are subjected to stress, and in particular to tensile stress. This embodiment allows a minimum encumbrance of the inflatable member in a deflated condition.

in an embodiment the tie members have the shape of threads and form with the two meshes a so-called 3D (three-dimensional) or double-knit fabric. This embodiment allows to distribute a high number of tie members with a relatively high surface density, such as to enable a satisfactory control of the shape of the inflatable member and, if necessary, a sufficient limitation of the expansion of the inflatable member. Preferably, each thread (having the function of a tie) comes out from one of said first and second mesh and is integrally and continuously interlaced with the other one of said first and second mesh. Substantially, it is a continuous interlacing between the threads forming the meshes.

In an embodiment, each wall is associated, e.g. glued, to the respective mesh, and has a surface extension greater than the mesh associated thereto; perimetrically, each wall has peripheral edges projecting with respect to the meshes, edges which are joined therebetween in a gas-tight manner. This embodiment entails the advantage of simplifying the steps of manufacturing the inflatable member.

In an embodiment, the first mesh is perimetrically fixed in direct contact with the second mesh, e.g. by seaming. This embodiment entails the advantage of allowing an improved strength of the inflatable member at the inflation stage, reducing the risk of wall tearing and ripping, and allows the inflatable member to satisfactorily endure pressure waves occurring inside the inflatable member at the perimetral zones during the inflation stage.

In an embodiment, the tie members are elastic. Elasticity entails the advantage of enabling a controlling of tie member tensioning (by elastic deformation control), and therefore a further possibility of controlling the shape of the inflatable member in an inflated condition, as well as of facilitating a subsequent deflation of the inflatable member (by return to an undeformed condition).

In an embodiment, the inflatable member comprises a reinforcing layer associated to a respective superficial portion of the inflatable member; in a preferred embodiment, the reinforcing layer is interposed between a mesh and the respective wall associated thereto. When the protection device is arranged in a vehicle, said reinforcing layer faces a region from which concentrated forces may come; in other words, the reinforcing layer is interposed between the internal chamber of the inflatable member and any sharp objects.

The reinforcing layer, which in the example is a sheet of a material like, e.g., glass fiber or Carbon fiber in a polyurethane matrix, and therefore not inconvenient for the positioning of the protection device in the vehicle. However, when the inflatable member is in an inflated condition, it is placed under tensile stress by the inflatable member itself and therefore assumes a more rigid behaviour. In particular, the presence of the reinforcing layer is advantageous as it allows to increase strength to penetration by sharp objects: a concentrated force (e.g., due an impact against a sharp object) acting on the reinforcing layer is redistributed by the latter on a wider to surface of inflatable member.

Thus, local deformation of the inflatable member due to a concentrated force is reduced, and therefore protection capability of the protection device is increased, as it is reduced the possibility that said sharp object may deform to such a point the inflatable member, until impacting on the user's body or piercing the internal chamber. Moreover, the presence of the reinforcing layer ensures to the inflatable member a good protection effectiveness even when the latter is not completely inflated.

Other advantages, features and operation steps of the subject of the present disclosure will be made evident in the following detailed description of some preferred embodiments thereof, given by way of example and not for limitative purposes. However, it is evident how each embodiment could have one or more of the advantages listed above; anyhow, it is not required for each embodiment to concurrently have all of the advantages listed.

Reference will be made to the figures of the annexed drawings, wherein.

Figure 7:
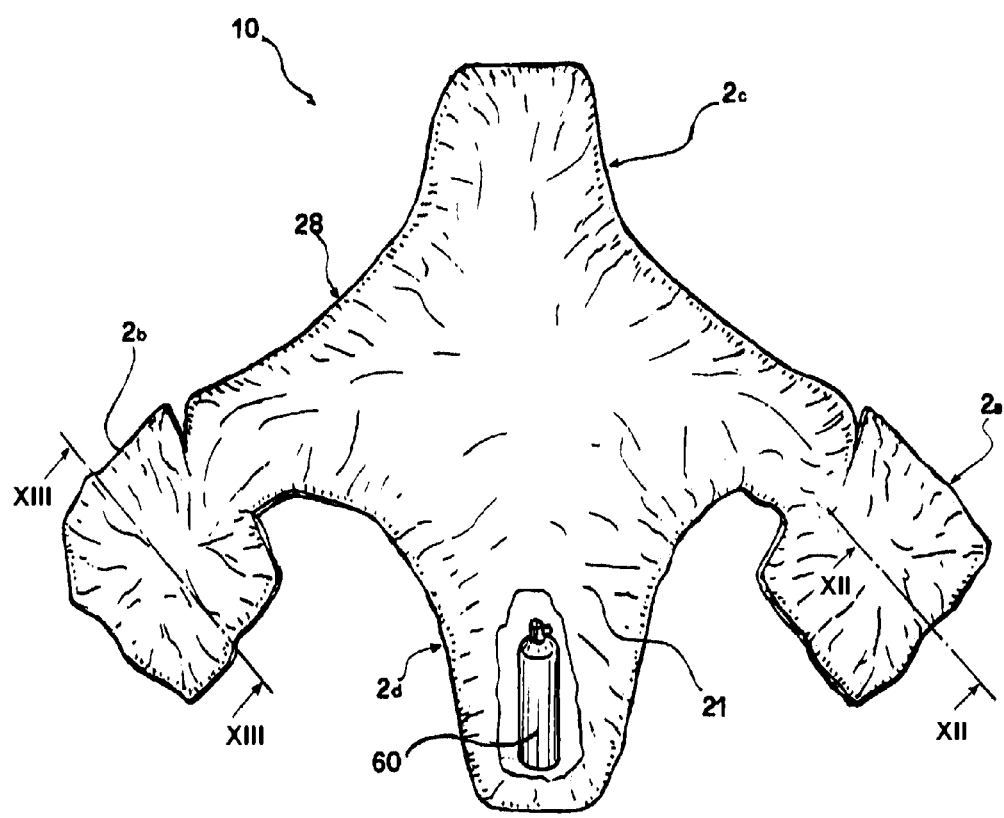
FIG. 7 shows a partially sectional top plan view, on an enlarged scale, of the protection device of FIG. 5.
Figure 8:
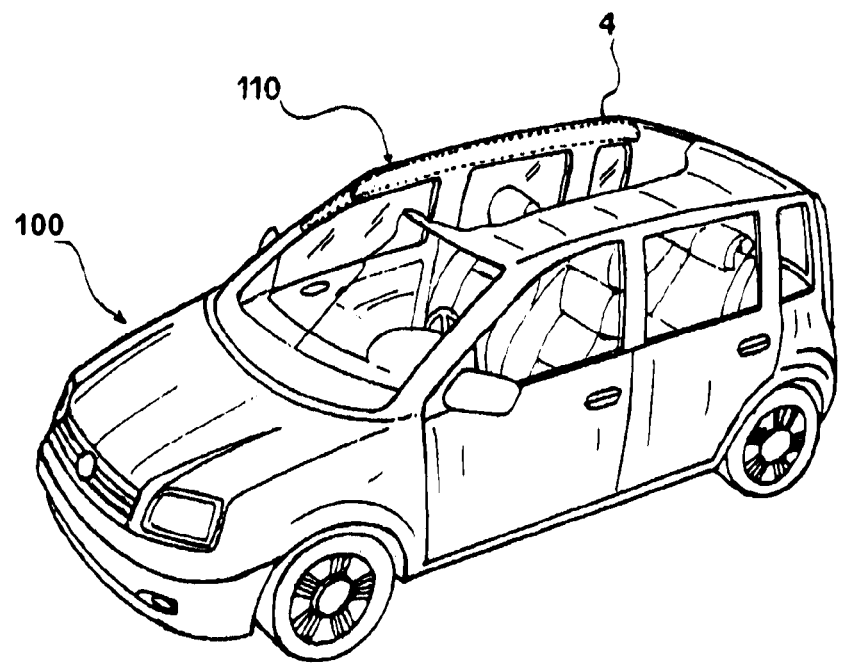
FIG. 8 shows a perspective view of a vehicle including a protection device according to the present disclosure, in a deflated condition.
Figure 8A:
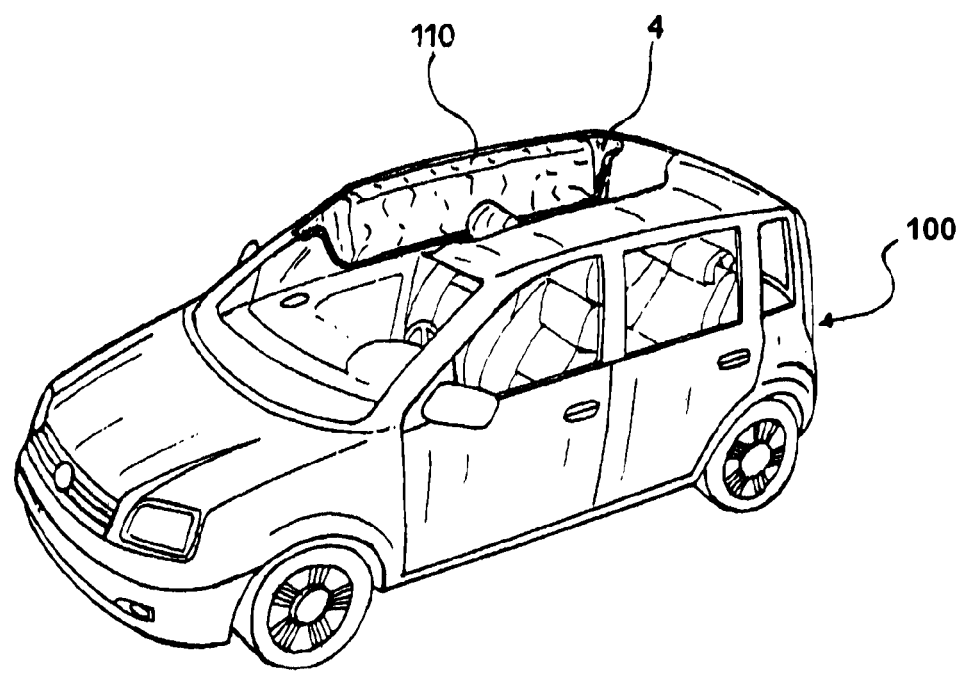
FIG. 8A shows a perspective view of the vehicle of FIG. 8, in which the protection device is in an inflated condition.
Figure 16:
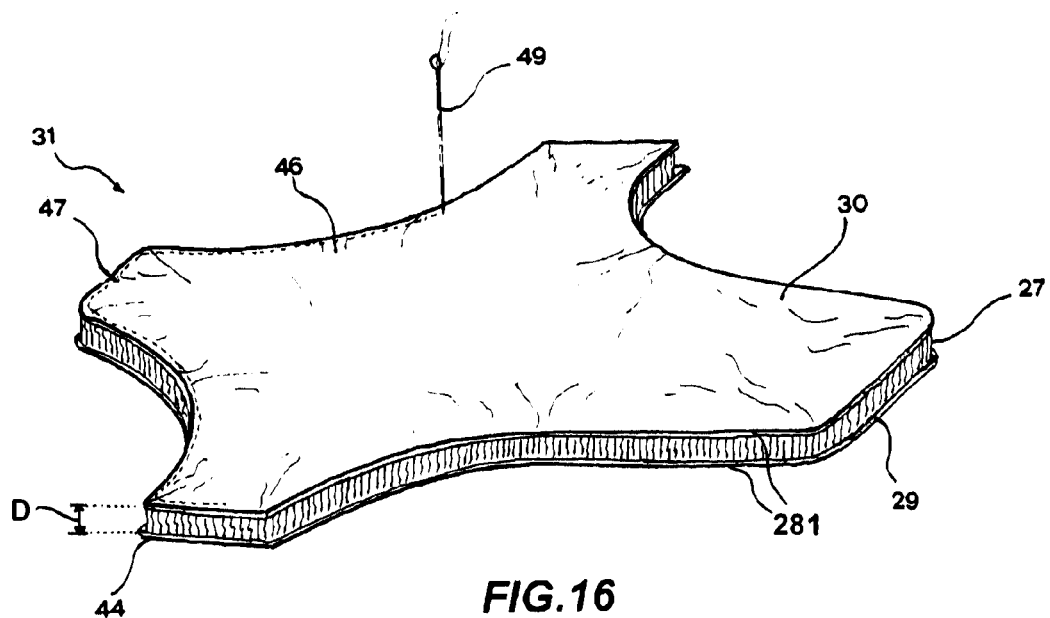
Figure 17:
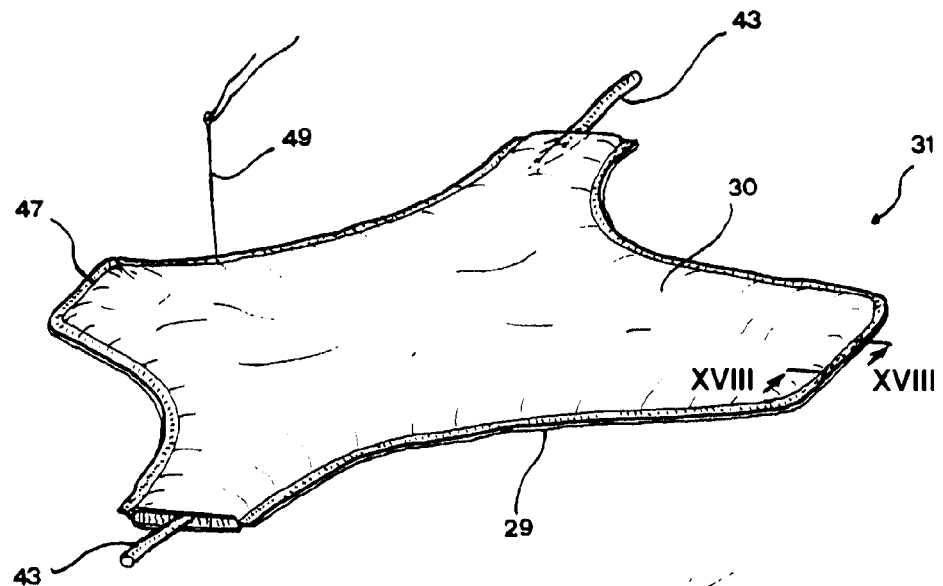
Figure 18:
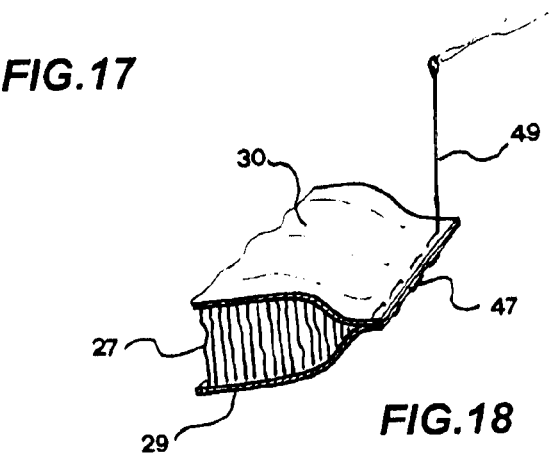
Figure 19:
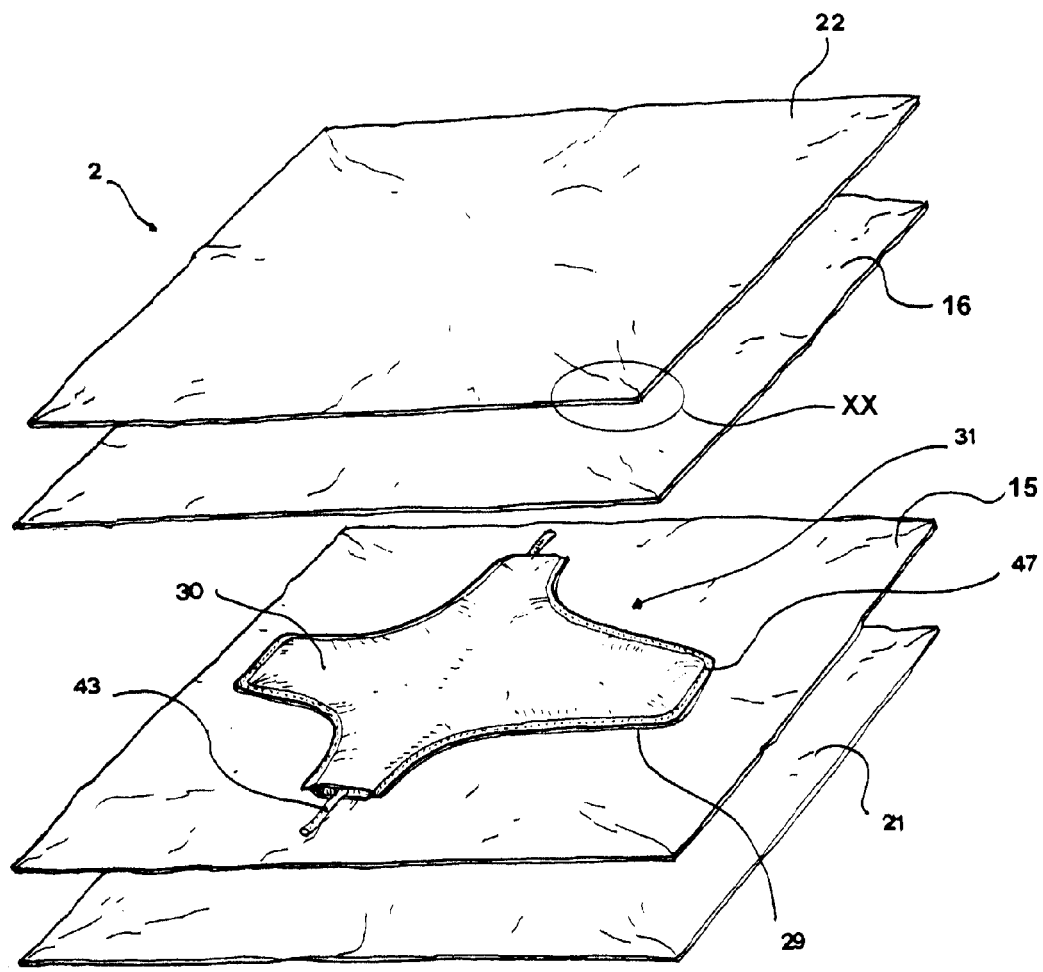
Figure 20:
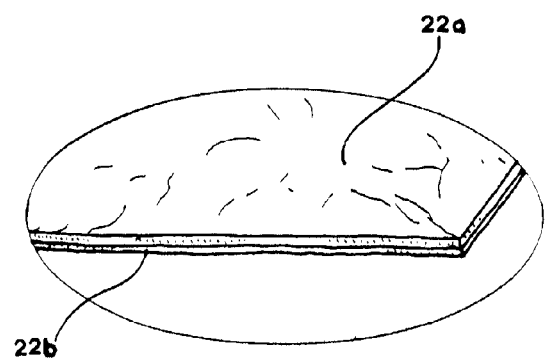
Figure 21:
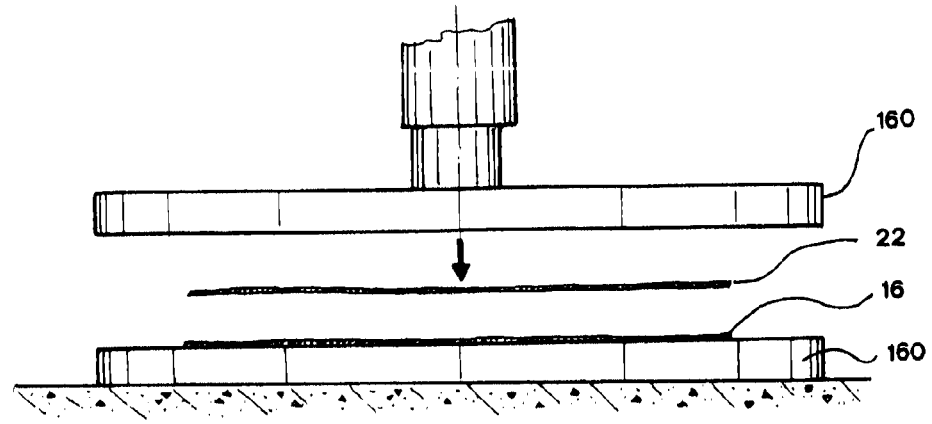
Figure 22:
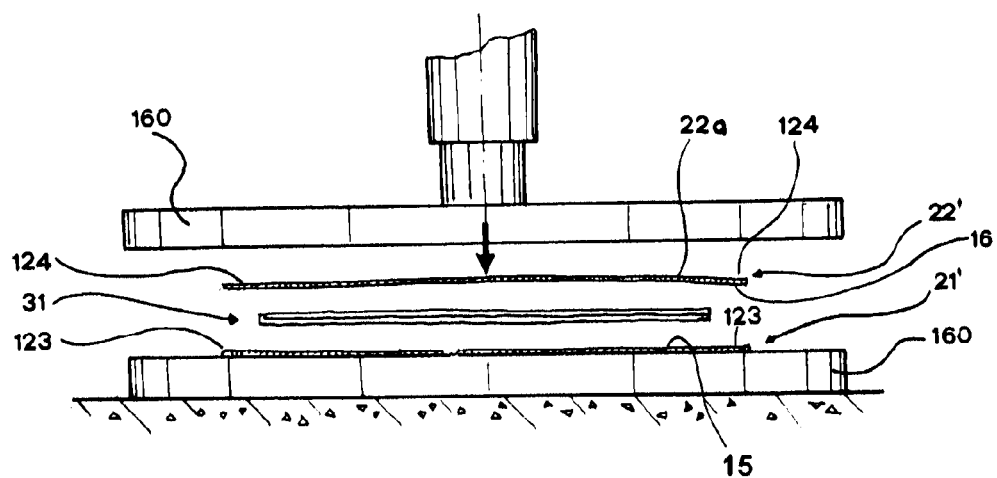
Figure 23:
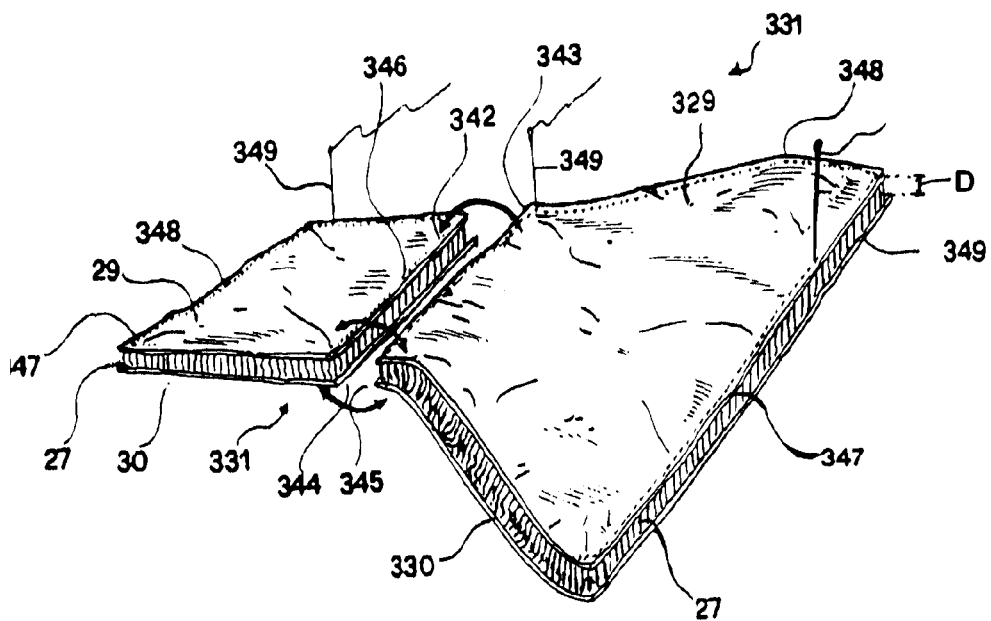
Figure 24:
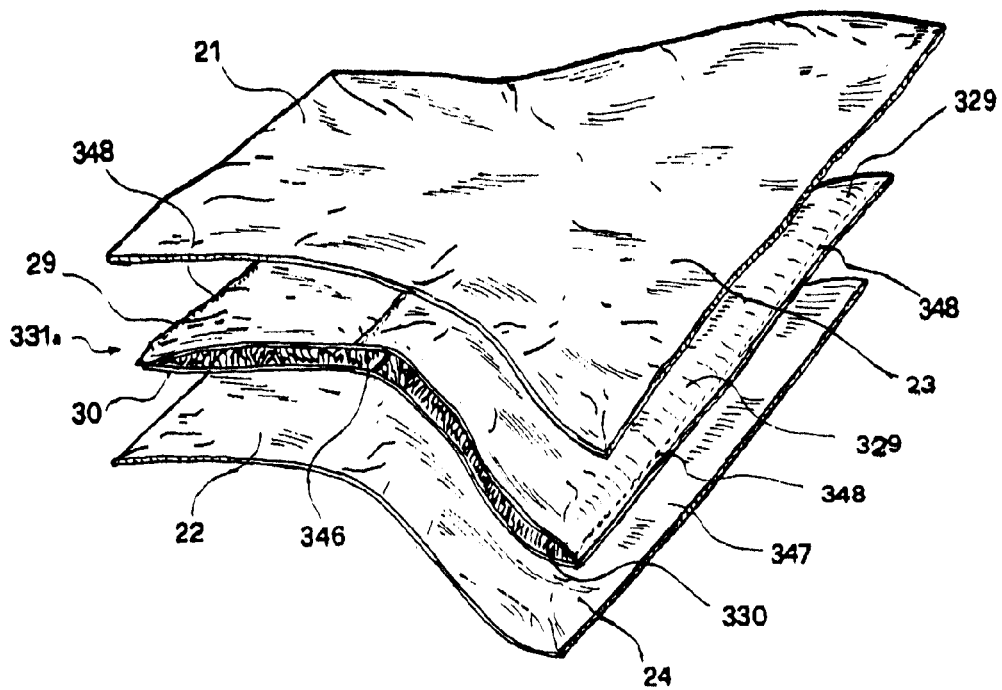
Figure 25:
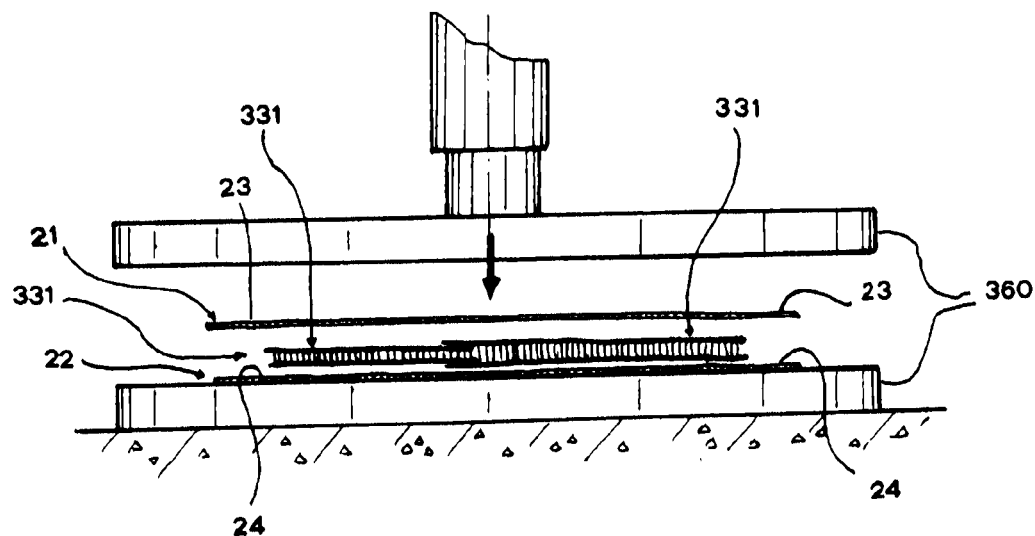
Figure 26:
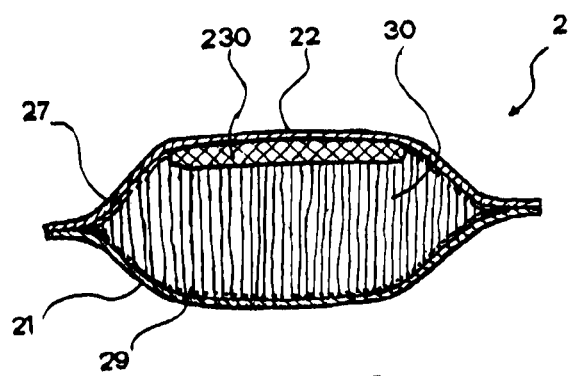
Figure 27:
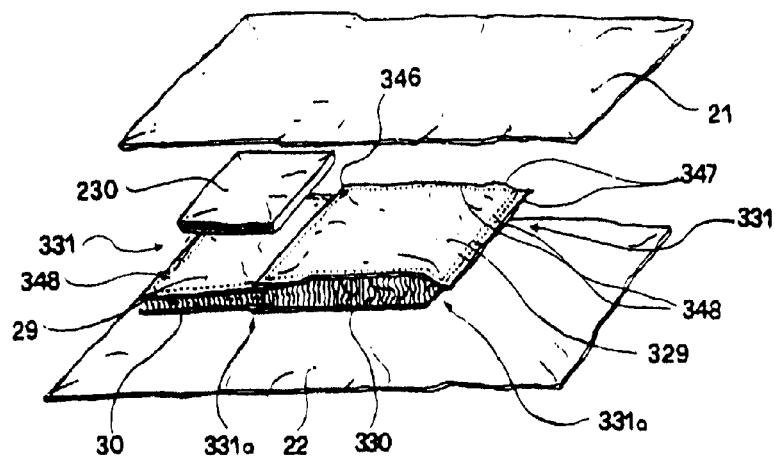
Figure 28:
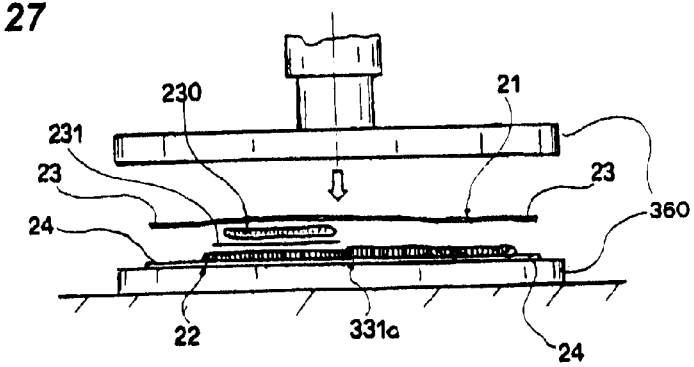
Figure 29:
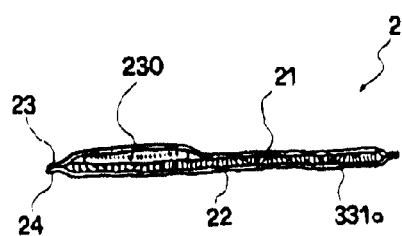
Figure 30:
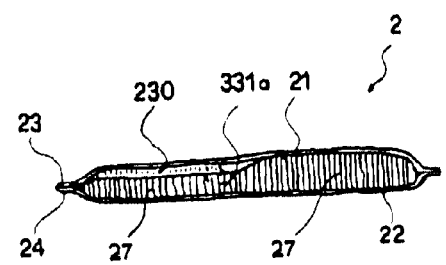
Figure 33:
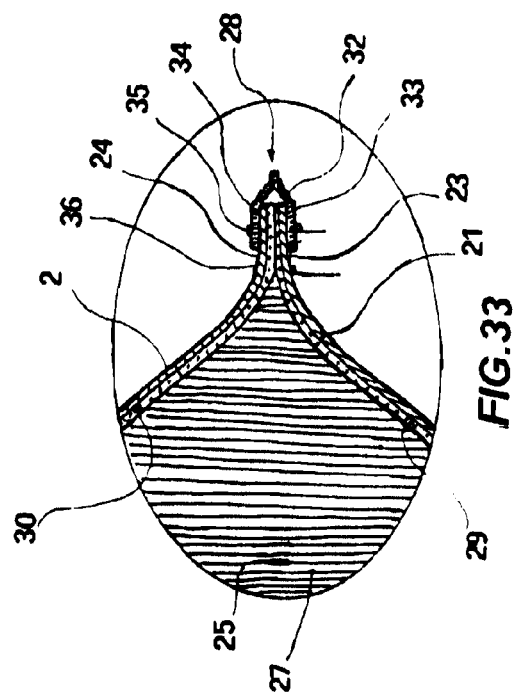
Figure 34:
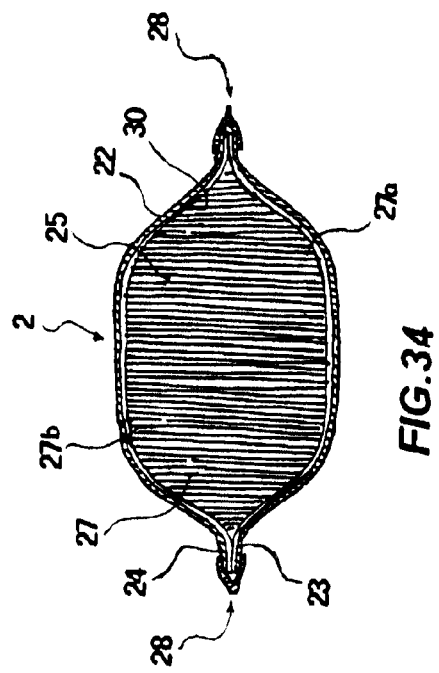
Figure 31:
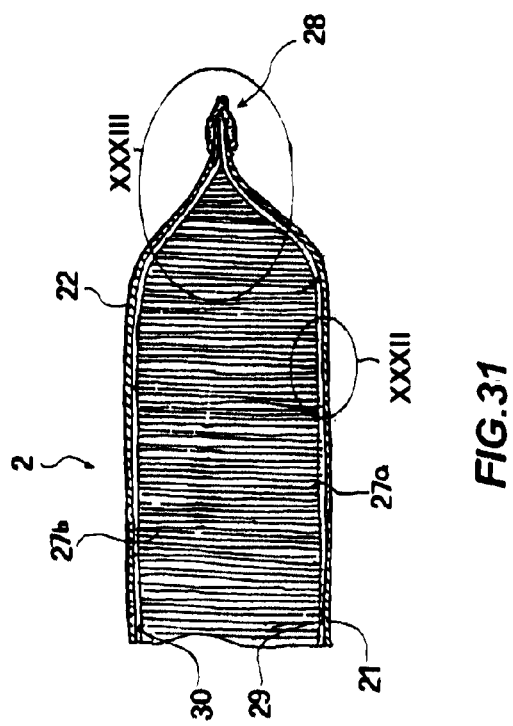
Figure 32:
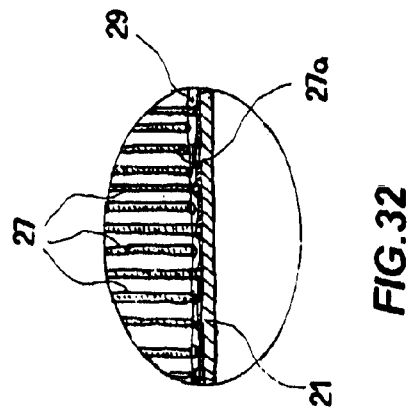

FIG. 16 schematically shows a first step of a method for manufacturing a protection device according to the present disclosure;

FIG. 17 shows, schematically and in a perspective view, a second step of a method for manufacturing a protection device according to the present disclosure;

FIG. 18 shows, on an enlarged scale, a detail in a section along line XVIII-XVIII of the protection device of FIG. 17;

FIG. 19 shows a protection device according to the present disclosure with detached parts;

FIG. 20 shows a detail XX of FIG. 19;

FIG. 21 shows, schematically and in a side view, a third step of a method for manufacturing a protection device according to the present disclosure;

FIG. 22 shows, schematically and in a side view, a fourth step of a method for manufacturing a protection device according to the present disclosure;

FIG. 23 shows, in a perspective view, a first step of a method for manufacturing a protection device according to the present disclosure;

FIG. 24 shows, in a partially sectional perspective view, another step of a method for manufacturing a protection device according to the present disclosure;

FIG. 25 shows, schematically and in a partially sectional side view, yet another step of a method for manufacturing a protection device according to the present disclosure;

FIG. 26 shows a sectional view of a protection device according to the present disclosure in accordance with a further embodiment;

FIG. 27 shows, in a partially sectional perspective view, a step of a method for manufacturing a protection device according to the present disclosure;

FIG. 28 shows, schematically and in a partially sectional side view, another step of a method for manufacturing a protection device according to the present disclosure;

FIG. 29 shows, in a sectional side view, a protection device, obtained by the method of FIGS. 27 and 28, and in a deflated condition;

FIG. 30 shows, in a sectional side view, the device of FIG. 29 in an inflated condition;

FIG. 31 shows a sectional view along line XII-XII of the protection device of FIG. 7, in accordance with a further embodiment;

FIG. 32 shows a view of a detail XXXII of the protection device of FIG. 31 on an enlarged scale;

FIG. 33 shows a view of a detail XXXIII of the protection device of FIG. 31 on an enlarged scale;

FIG. 34 shows a sectional view along line XIII-XIII of the protection device of FIG. 7, in accordance with a further embodiment.

Referring to the annexed figures, by reference numbers 10, 110, 120, 130, 140, 150 protection devices according to the present disclosure are denoted, in accordance with respective embodiments, as described hereinafter.

The protection device 10 of a first embodiment is adapted to be associated to a first vehicle, in the example to a motor-cycle 1, whereas the protection devices 110, 120, 130, 140, 150, 170 of the other embodiments are adapted to be associated to a second vehicle, in the example a car 100.

The protection devices 10, 110, 120, 130, 140, 150 are arranged in a relevant housing 3, 4, 5, 63, 64, 65 of the respective vehicle 1, 100, and are adapted to assume substantially a first resting condition, or deflated condition, hidden in said housing 3, 4, 5, 63, 64, 65, and a second active condition or inflated condition, in which the protection devices 10, 110, 120, 130, 140, 150, 170 come out from the housing 3, 4, 5, 63, 64, 65 as illustrated in FIGS. 3, 4, 8A, 9A, 9C, 10, 11A, 11B, 11C. The inflation and actuation modes of the protection devices 10, 110, 120, 130, 140, 150, 170 will be described hereinafter in the description.

The protection device 10 for a motorcycle 1 is arranged in a housing 3 near the handlebar 8, e.g. in a housing 3 obtained in a top portion of the chassis or of the tank; when inflated, the protection device 10 arranges itself in a region in front of the motorcycle user, i.e. on the handlebar, on the tank and on the headlight.

The protection device 110 for a car 100 is arranged in a housing 4 between the roof and the side panel (wall) of the car; when inflated, the protection device 10 comes out, arranging itself both at the roof and at the door side.

The protection device 120 for a car 100 is arranged in a housing 5 below the steering wheel 81 and/or the dashboard 82; in an inflated condition, the protection device 120 protects the legs and knees of the user (driver or passenger) from a front impact against the bottom part of the dashboard 82.

The protection devices 130, 140, 150 for a car 100 are arranged in respective housings 63, 64, 65 obtained respectively on a side of a headrest 83, on a side of the backrest 84 of a seat 86, and on a side of the seating 85 of the seat 86. Preferably, said housings 63, 64, 65 and the respective protection devices 130, 140, 150 are arranged on both sides of the headrest 83 and of the seat 86.

In an inflated condition, the protection devices 130, 140, 150 come out of the respective housings 63, 64, 65 and, thanks to their flattened and controlled shape, easily arrange at the user's sides, respectively at the user's head, torso and knees, for a protection of the user from side impacts.

Essentially, the protection devices 110, 120, 130, 140, 150 are adapted to "wrap" the user on all sides on which an impact may occur.

Figure 9:
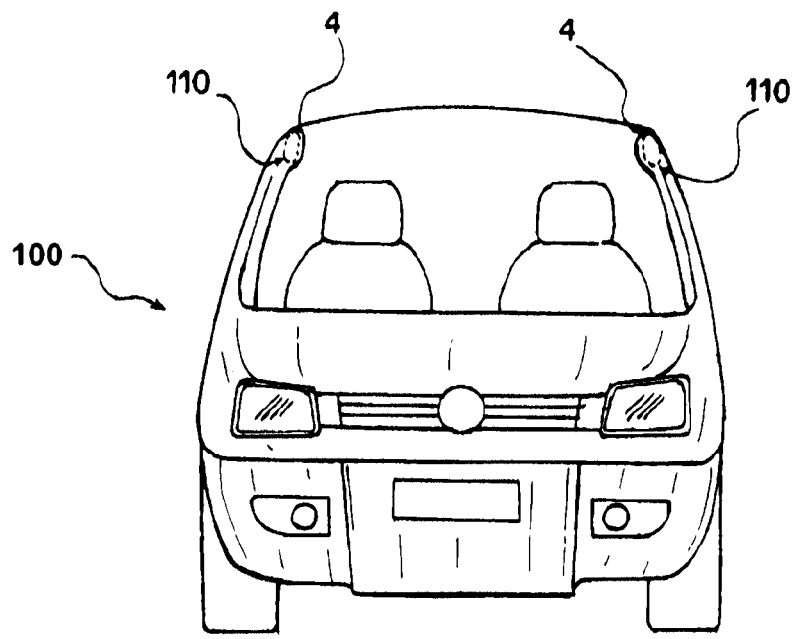
FIG. 9 shows a front view of the vehicle of FIG. 8, in which the protection device is in a deflated condition.
Figure 9A:
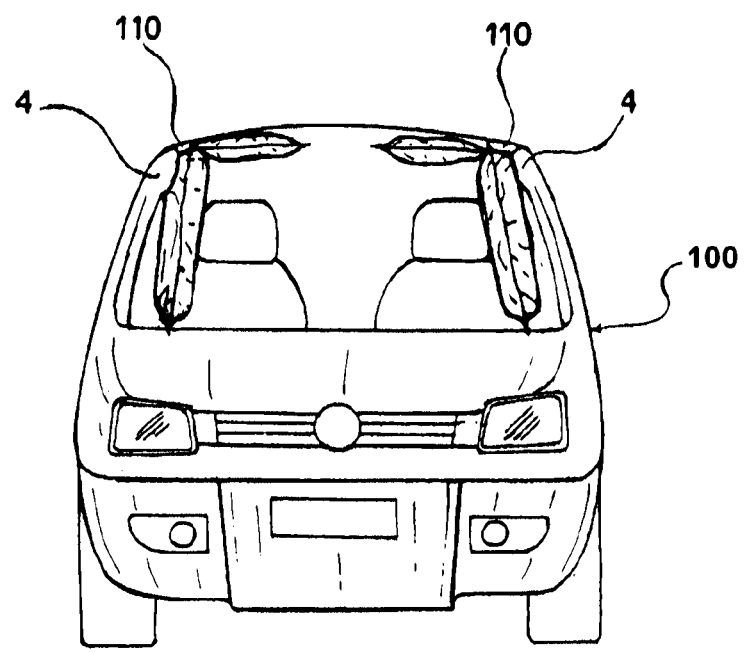
FIG. 9A shows a front view of the vehicle of FIG. 8, in which the protection device is in an inflated condition.
Figure 9B:
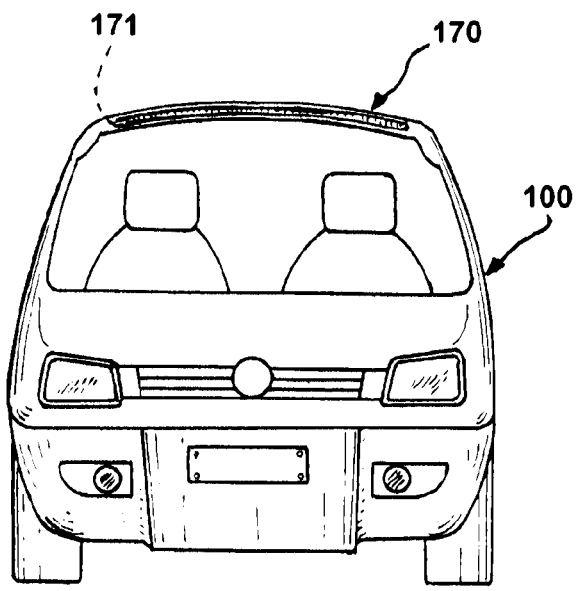
FIG. 9B shows a front view of a vehicle including a protection device in a deflated condition, housed in a relevant housing.
Figure 9C:
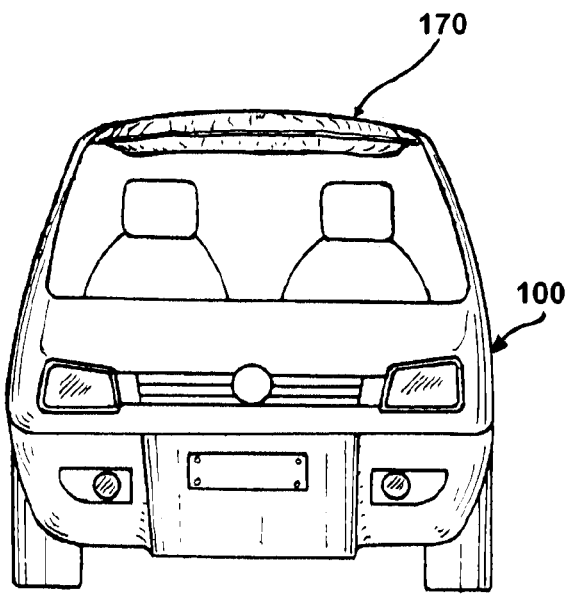
FIG. 9C shows a front view of a vehicle including a protection device in an inflated condition.
Figure 10:
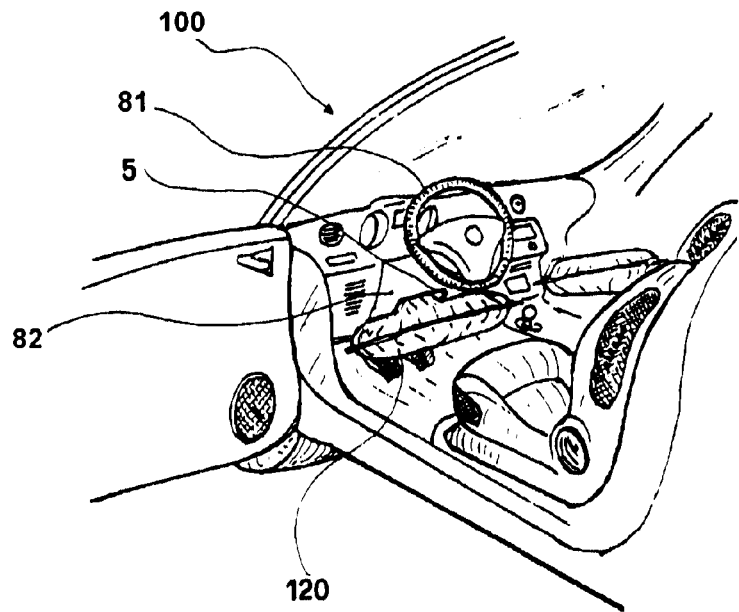
FIG. 10 shows a perspective view of a vehicle including another protection device according to the present disclosure, in an inflated condition.
Figure 11A:
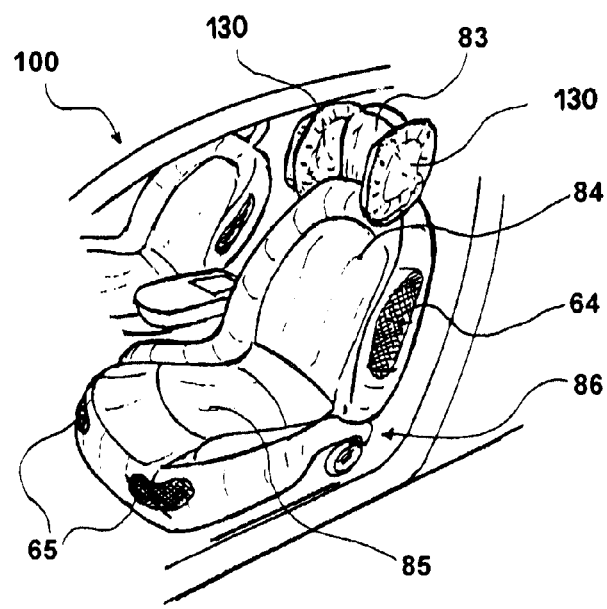
FIGS. 11A, 11B and 11C show perspective views of a vehicle including other respective protection devices according to the present disclosure, associated to a seat of the vehicle and in an inflated condition.
Figure 11B:
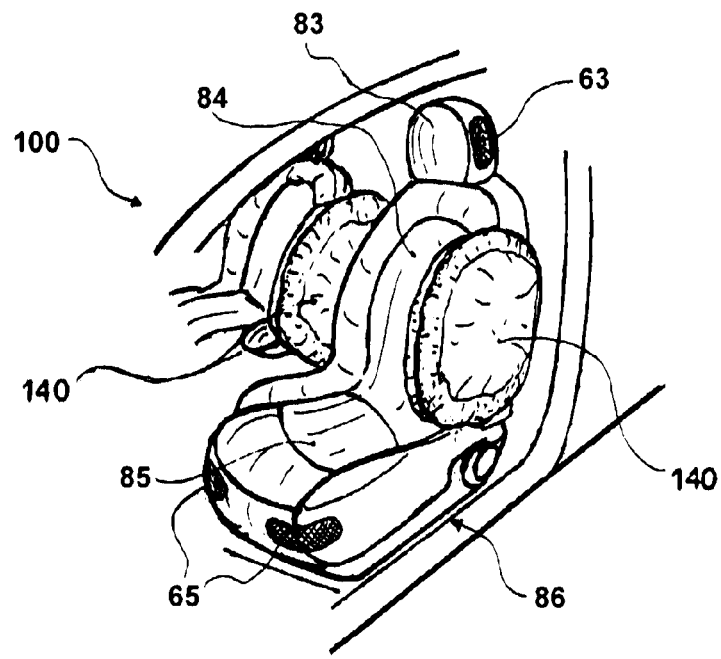
Figure 11C:
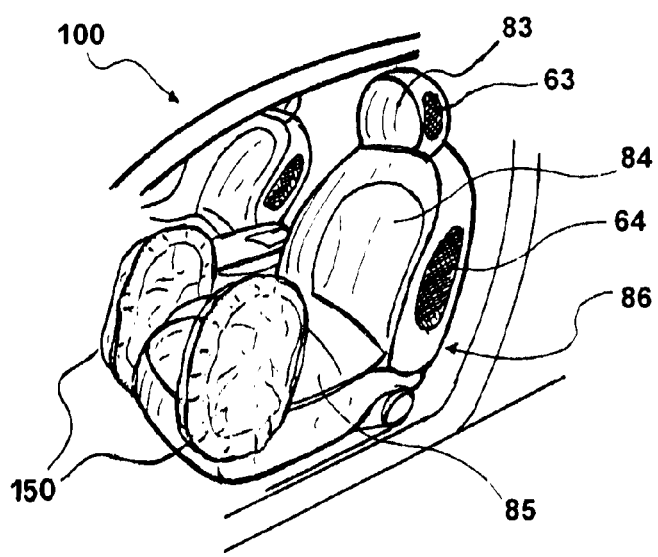

In FIGS. 9B and 9c, a protection device 170 is illustrated associated to a vehicle, and in particular arranged in a respective housing 171 obtained at the roof of a car 100.

When the protection device 170 is inflated, it generally covers the entire roof of the car, active as effective protection for a user above all in case of rollover of the car 100.

The protection devices 10, 110, 120, 130, 140, 150, 170 shown in the figures are exemplary; in fact, it is understood that a vehicle 1, 100 might be provided with only some of said devices, or it might be provided with protection devices having shapes and/or positions different with respect to the ones shown.

The protection devices 10, 110, 120, 130, 140, 150, 170 differentiate by overall shape, which is selected depending on the type of specific vehicle to which each of them is associated and according to the region to be protected in the vehicle 1, 100. As for the remaining aspects, the protection devices 10, 110, 120, 130, 140, 150, 170 substantially include the same structural members.

For this reason, for simplicity's sake in the disclosure, hereinafter reference will be made only to the protection device 10, it being understood that the same description is likewise valid also for protection devices 110, 120, 130, 140, 150, 170.

Figure 1:
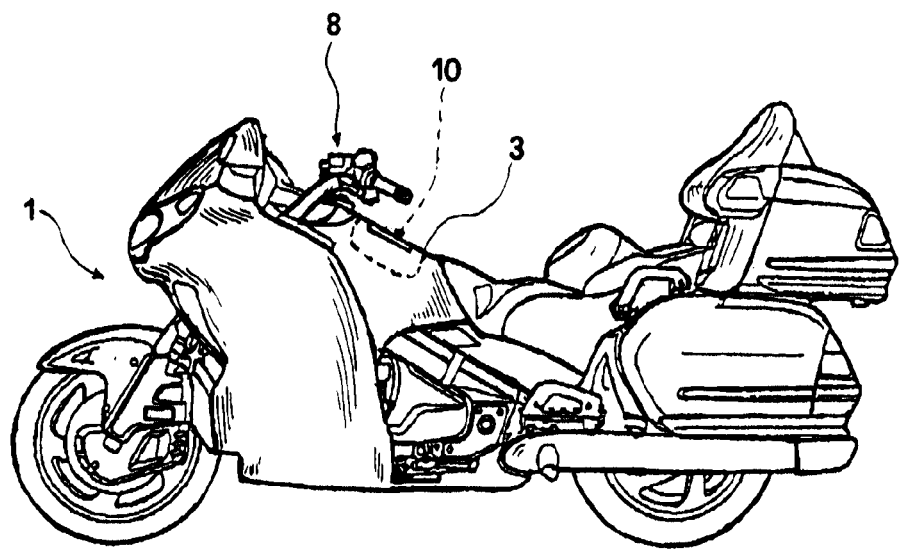
FIG. 1 shows a side view of a vehicle including a protection device according to the present disclosure, in a deflated condition.
Figure 2:
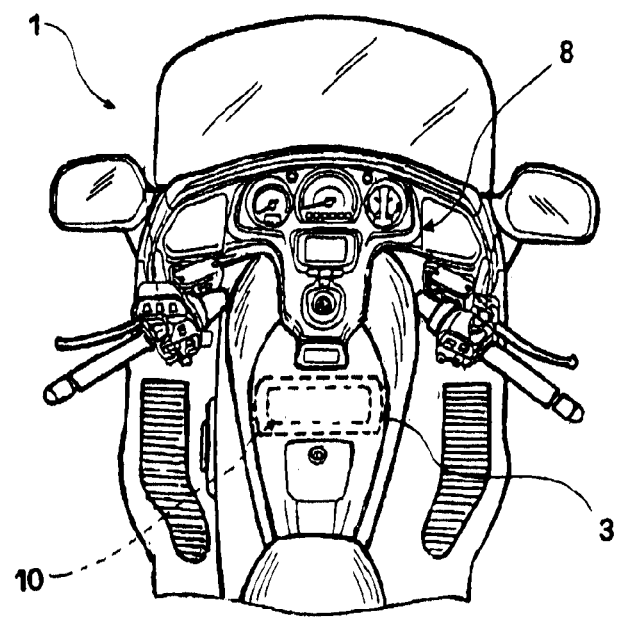
FIG. 2 shows a partial top plan view of the vehicle of FIG. 1.
Figure 3:
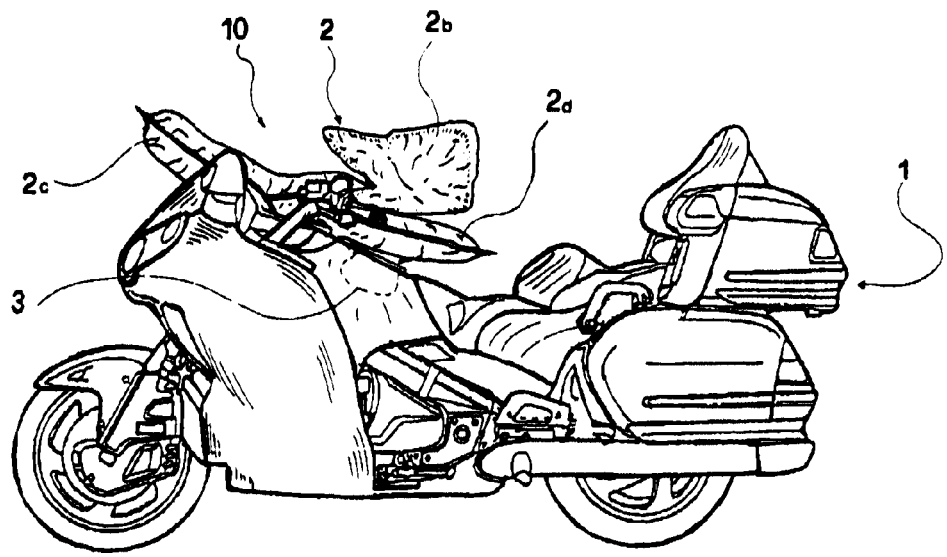
FIG. 3 shows a side view of the vehicle of FIG. 1, in which the protection device is in an inflated condition.
Figure 4:
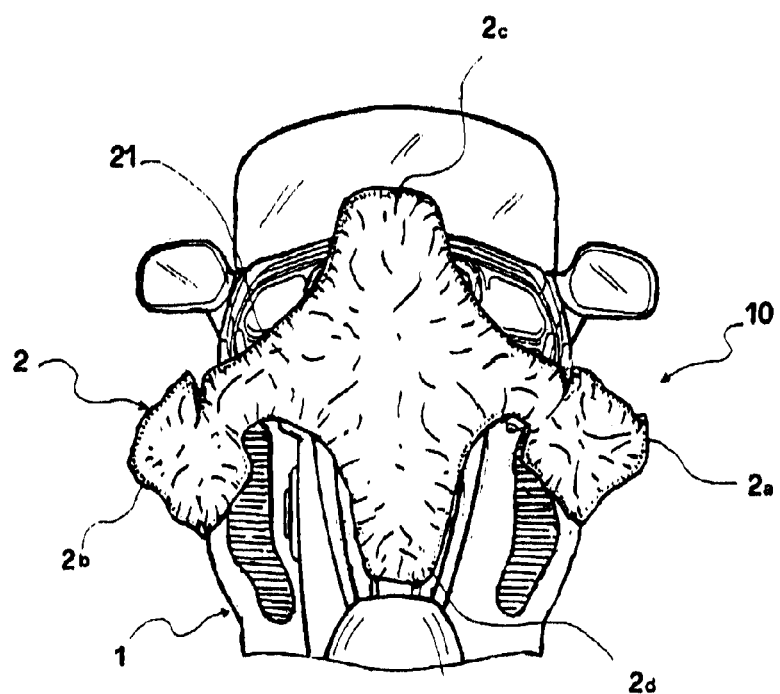
FIG. 4 shows a partial top plan view of the vehicle of FIG. 3.
Figure 5:
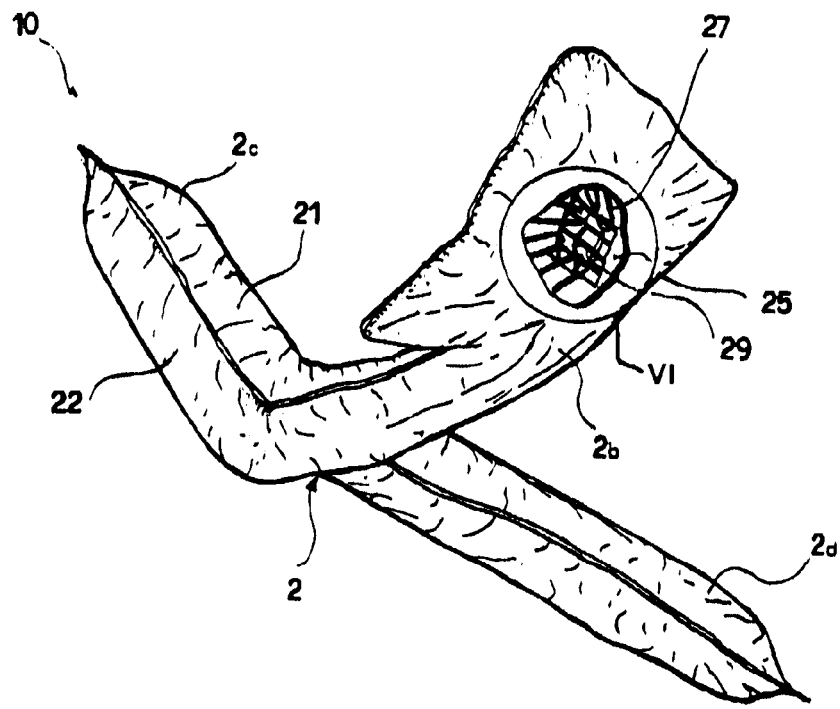
FIG. 5 shows a partially sectional side view, on an enlarged scale, of the protection device of FIG. 3.
Figure 6:
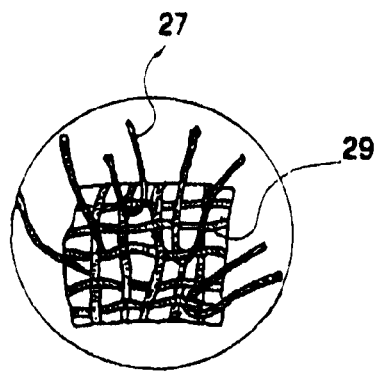
FIG. 6 shows a detail VI of FIG. 5, on an enlarged scale.

Referring to the figures, and in particular to FIGS. 5 and 6 and from FIG. 12 to FIG. 22, the protection device 10 comprises an inflatable member 2, inflatable by introduction of an inflating fluid, e.g. a cold gas, like Helium. The inflatable member 2 includes two walls 21, 22 arranged in a spaced apart relationship to form an internal chamber, in the example of material impermeable to said gas. Specifically, walls 21, 22 are associated therebetween, in the example fixed in a gas-tight manner, to form said internal chamber 25.

The inflatable member 2 also includes a textile structure, so-called double-layer structure, specifically denoted by reference number 31 in FIGS. 16 to 22, which is housed in the internal chamber 25.

The structure 31 includes two meshes 29, 30, in practice forming two layers, opposed therebetween and connected by a plurality of tie members 27.

In practice, the two walls 21, 22 form a case in which the structure including the two meshes 29, 30 is housed. In particular, each mesh 29, 30 is associated to a respective wall 21, 22.

By the term "tie member" 27 it is meant a member or entity having the function of keeping joined or constrained or stationary two or more portions of the inflatable member 2, said tie member being tensioned by tensile stress at least when the inflatable member 2 is in an inflated condition.

In the example the tie members 27 are of thread-shaped type, and are flexible and inextensible members. Therefore, they are suitably sized so that, when the inflatable member 2 is in a resting condition, they are preferably not subjected to tensioning and are collapsed in the internal chamber 25, whereas when the inflatable member 2 is in an inflated condition they are subjected to tensile stress, as illustrated by way of example in FIGS. 12 and 13.

In a further embodiment, the tie members 27, besides being of thread-shaped type and flexibale, are elastic members. Therefore, the tie members 27 are suitably sized so that, when the inflatable member 2 is in a resting condition, they are preferably not subjected to tensioning, or possibly subjected to a slight tensioning, whereas when the inflatable member 2 is in an inflated condition they are tensioned until reaching a maximum extension and a maximum tensioning. In particular, in the drawings the tie members 27 are sketched, merely by way of illustration, with the illustrated density, whereas according to the present disclosure it is advantageous that the tie members 27 be thickly distributed in the inflatable member 2, e.g. with a density of at least one tie member per each $cm^2$ of surface of the inflatable member 2, even more preferably, always by way of example, with a density comprised between 1 and 15 threads per each $cm^2$ of surface of the inflatable member 2, preferably between 4 and 6 threads per each $cm^2$.

Figure 12:
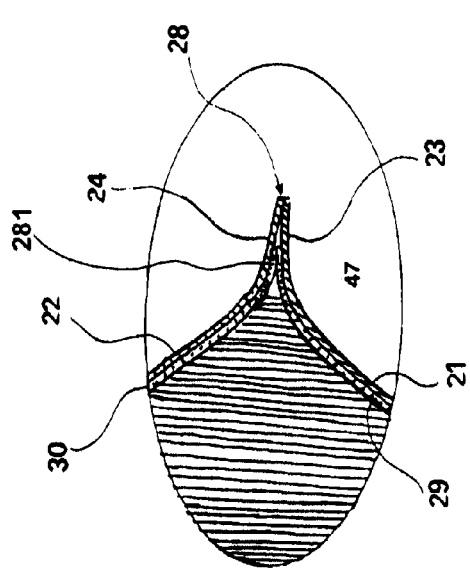
FIG. 12 shows a sectional view along line XII-XII of the protection device of FIG. 7.
Figure 13:
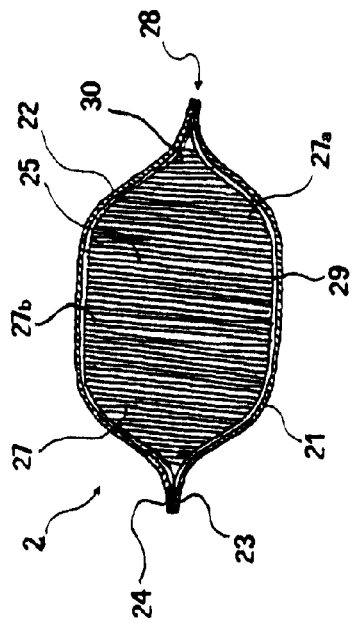
FIG. 13 shows a sectional view along line XIII-XIII of the protection device of FIG. 7.

By observing the sections illustrated in FIGS. 12 and 13, it may be noticed that the tie members 27 are distributed substantially homogeneously in the internal chamber 25.

As anticipated above, in the example the tie members 27 are flexible ties and have the shape of threads, and are made e.g. of polyester or polyamide, of a thickness comprised between about 500 and about 1000 decitex (Unit of length of a continuous thread or of a yarn), and have ends 27a, 27b fixed to the respective portions of meshes 29, 30 which they connect. Even more particularly, each thread 27 includes a bundle of continuous torsion-free fibers coming out from a single point of the respective mesh 29, 30.

In the example illustrated, each mesh 29, 30 has an extension such as to nearly entirely line a respective wall 21, 22.

Essentially, the inflatable member 2 includes a prefabricated structure, or body, including the two meshes 29, 30, and the two walls 21, 22, or sheets, in the example impermeable to gas; a wall 21 is arranged at the side of one mesh 29 and the other wall 22 is arranged at the side of the other mesh 30.

More specifically, the one mesh 29 is stably fixed, in direct contact, to the mesh 30 by glue or by seams, or alike fixings, at their perimeter 281.

The tie members 27 have opposite ends 27a, 27b stably fixed to the respective mesh 29, 30. The fixing at the opposite ends 27*a*, 27*b* of the tie members 27 is, e.g., obtained by mere insertion or interlacing of tie members 27 between wefts of the mesh 29, 30.

In practice, in the example illustrated in the figures, the tie members 27 are obtained by a determined number of threads which are fixed, in alternate sections, to the one mesh 29, and consecutively to the other mesh 30. In other words, each thread is threaded below a weft of the first mesh 29, is curved toward the opposite mesh 30, and is connected in the same manner to the opposite mesh 30, and so on.

Alternatively, the tie members 27 are connected to the mesh 29, 30 by glue, or by an interlacing or by fastening, or alike fixings.

Alternatively, the tie members 27 constitute mesh warp or weft portions, which come out from a mesh 29, 30 and interlace in the other mesh 30, 29. In practice, the structure 31 is obtained by concomitant weaving of the two meshes 29, 30 and connection of the meshes 29, 30 by warp or weft threads of the meshes themselves. Alternatively, each tie member 27 is a thread integrally interlaced with, or continuously evolving from, both said first and second mesh 29, 30. In practice, the thread/tie member 27 comes out from one of said first and second mesh 29, 30 and is integrally interlaced with the other one of said first and second mesh 29, 30.

The set of the two meshes 29, 30 and of the tie members 27 forms a so-called 3D (three-dimensional) or double-knit fabric.

Also the meshes 29 and 30 are made of polyester or polyamide.

The two walls 21, 22, or sheets, are made of a sheet of soft and gas-tight material, e.g. of polyamide or polyurethane; the two walls 21, 22 are opposed the one with respect to the other, and perimetrically fixed along their perimetral edges 23, 24.

In a further embodiment the walls 21, 22 are made of a laminate (partially visible in FIG. 19 and in FIG. 20), which is commonly utilized as clothing lining and includes a fabric layer 22*a*, in the example 100% nylon (representing about 65% b/w of the laminate) and a glue layer 22*b*, in the example a glue film (representing about 35% b/w of the laminate), e.g. polyurethane glue, distributed on the fabric layer 22*a* by roller spreading.

Even more particularly, each mesh 29, 30 is stably fixed to the surface of the respective wall 21, 22, by a glue film (not visible in FIGS. 12, 13, 14 and 15 and denoted, e.g., by numbers 15, 16 in FIG. 19) or by seams, or alike fixings.

In case of use of laminate, the glue film is arranged in contact with the glue layer 22*b* of the laminate.

The hereto-described protection device 10 according to the present disclosure is manufactured as follows.

In an opposed position and at a preset distance, a pair of meshes 29, 30 are preliminarily prearranged, to which there are fastened, or otherwise fixed, ends 27*a*, 27*b* of the tie members 27, in which the length of said tie members 27 is selected so as to determine a maximum mutual distance D between the meshes 29, 30 corresponding to a maximum local expansion of the inflatable member 2 in an inflated condition.

Then, the structure 31 thus obtained, including the meshes 29, 30 and the ties 27, is included between the two walls 21, 22, i.e. it is arranged inside the chamber 25. Between the meshes 29, 30 it is preferably arranged also a gas canister 60 for inflation.

The two walls 21, 22 have perimetral portions 23, 24 projecting with respect to the meshes 29, 30. In practice, the two walls 21, 22 have a surface extension greater than the respective meshes 29, 30, so that the perimetral portions 23, 24 can be connected therebetween without interposition of the meshes 29, 30.

Said perimetral portions 23, 24 are stably and sealingly connected thereamong, e.g. by heat-sealing, along the perimetral edge 28 so as to contain the structure 31 and make the internal chamber 25 gas-tight.

Moreover, the walls 21, 22 are fixed, e.g. by hot-press gluing, to the respective meshes 29, 30. In particular, the entire external surface of the meshes 29, 30 is fixed to the respective wall 21, 22, In other words, each mesh 29, 30 lines the respective wall 21, 22.

Even more specifically, referring to FIGS. 16 to 22, the method envisages to provide a structure 31 comprising meshes 29, 30 to which are fastened, or otherwise fixed, as indicated above, ends 27*a*, 27*b* of tie members 27. In FIG. 16 the structure 31 is illustrated slightly inflated, so as to let understand the presence of the tie members 27, and is indicated with a substantially rectangular profile for simplicity's sake in the explanation. However, it is evident that the structure 31 has shape and size substantially equivalent to a respective inflatable member 2 to be obtained; moreover, the length of the tie members 27 is selected so as to locally determine a maximum mutual distance D between the meshes 29, 30 corresponding to a maximum local expansion of the respective inflatable member 2 in an inflated condition.

An edge 44 of the mesh 29 is seamed to a respective edge 46 of the mesh 30 facing thereon (seam line denoted by 47 in FIG. 17). In FIGS. 16 and 17, the seaming operation is exemplified with needles 49, however it is highlighted that the seams 47 may be made by a machine or with other equipment conventional for a person skilled in the art. The seam line 47 substantially follows the perimeter 281 of the structure 31.

Even more particularly, in the example the seam 47 is a linear seam, made with thread, e.g. of polyamide, and including 2 to 3 stitches/cm (i.e., a seam pitch comprised between about 3 and 5 mm).

Prior to completing the seam 47, a duct 43 for connection to a deflation valve (not illustrated), is included between the meshes 29, 30. In case the canister 60 was arranged outside the chamber 25, also a cannula (not illustrated) for connection to the canister 60 may be included between the meshes 29, 30, similarly to the duct 43.

In FIG. 18 a detail of the seam 47 is illustrated, in which it appears evident how the seam thread transversally crosses the two meshes 29, 30, tightening them into direct mutual contact.

The structure 31 is enclosed between the sheets 21, 22 of soft and gas-tight material, e.g. of polyurethane or polyamide, or said above-mentioned laminate, in which the sheets 21, 22 have a surface extension greater than said structure 31.

In the example, the sheets 21 and 22 are glued to the respective meshes 29, 30 by means of a glue film, in the example a polyurethane film having a thickness of about 100 μm, denoted by numbers 15, 16, utilizing a hot press 160 (which, e.g., works at temperatures comprised between about 140° C. and 180° C., preferably at about 150° C.) to foster adhesion and mutual gluing.

In particular, each glue film 15, 16 is included between a mesh 29, 30 of the structure 31 and the respective sheet 21, 22, as illustrated in FIG. 19.

Even more particularly, each glue film 15, 16 is fixed by hot press 160 to the respective sheet 21, 22 in a first step of the method as illustrated in FIG. 21, to form a composite layer 21', 22' (FIG. 22). If the above-mentioned laminate is utilized, gluing occurs by arranging the glue film 15, 16 at the side of the glue layer 22*b* of the laminate.

At a later stage, the structure 31 (once the perimetral seam 47 is made) is included between the two composite layers 21', 22'.

Peripheral edges 123, 124 of the composite layers 21', 22', at which meshes 29, 30 are not enclosed, are directly glued the one on the other in a gas-tight manner.

It was found that the use of laminate gives satisfactory results. In particular, the glue film 15, 16 has a high adherence with the laminate (a gluing occurring directly with the glue layer 22b); moreover, the glue film 15, 16 from the other side penetrates the meshes 29, 30, so as to fill the pores of the meshes 29, 30.

Thus, a high impermeability of the inflatable member 2 is guaranteed, without seal loss, thanks to the distribution of the glue film 15, 16 in the pores of the meshes 29, 30.

In addition, the laminate has a high lightness of weight and, concomitantly, gives high strength to the inflatable member 2. Moreover, the fabric layer 22a of the laminate is an inextensible fabric which opposes any bubble formation during the machining steps.

The fabric layer 22a, being flexible, moreover adjusts to any mutual displacement occurring between the glue film 15, 16 and the laminate itself during the fixing in the press 160.

It should also be noted that the two meshes 29, 30 of the structure 31 are perimetrically fixed directly therebetween, by the abovementioned seam 47. In other words, the meshes 29, 30 are not connected therebetween merely by the tie members 27, but also perimetrically fixed in direct contact, in the example by perimetral seam 47.

The seam 47 or an alike perimetral fixing of the meshes 29, 30 entails a significant advantage. In particular, when the inflatable member 2 is subjected to sudden inflation (with inflation times of the order of milliseconds) inside of the inflatable member localized pressure waves occur, even higher than 3 bar.

Thanks to the presence of the seam 47, a pressure distribution or sharing is performed along the entire seam 47, until the pressure which onsets inside the inflatable member 2 is homogeneous (e.g., the overpressure—with respect to atmospheric pressure—is comprised, casewise, between 0.5 bar and 3 bar).

Therefore, the seam 47 serves as a barrier against excessive pressure waves in one or more perimetral zones of the inflatable member 2 where edges 23, 24 of the sheets 21, 22 are joined, and said seam 47 fosters a pressure redistribution and allows to avoid a possible tearing of the sheets 21, 22.

Moreover, it is observed that the seam 47 yields a practical advantage from a manufacturing standpoint as well, since during the machining steps the meshes 29, 30 do not move the one with respect to the other.

In a further embodiment, the above-described inflatable member 2 comprises a reinforcing layer 230 (FIG. 26) interposed between a wall 22 and the respective mesh 30.

Said reinforcing layer 230 in the example is comprised of a sheet, or foil of a composite material (e.g., glass fiber or Carbon fiber in a polyurethane matrix), having a thickness of a few millimetres (e.g., 2 mm) and a surface extension smaller than the wall 22 and comparable to the region to be protected. Said reinforcing sheet 230 is fixed, e.g. by means of polyurethane glue not visible in FIG. 26, to the respective wall 22 and to the respective mesh 30 between which it is interposed. Such a reinforcing layer 230 can be inserted at a suitable time during the above-described steps of manufacturing the inflatable member 2.

According to another aspect of the present disclosure, the protection device 10, 110, 120, 130, 140, 150 can be manufactured according to any one shape or outline.

Therefore, it is possible to inflate in a controlled manner an inflatable member of any shape, like e.g. the inflatable member 2 having the shape visible in FIGS. 3 to 7. In particular, in the example illustrated, the inflatable member 2 has a substantially cross-like shape and comprises four regions 2a, 2b, 2c, 2d, of which:

a first region 2a, intended to be placed at a right side of the handlebar 8;

a second region 2b, arranged at a portion opposite to the first region 2a with respect to the center of the cross and intended to be placed at a left side of the handlebar 8;

a third region 2c, intended to be placed at a center of the handlebar 8 and above a headlight of the motorcycle 1;

a fourth region 2d, arranged at a portion opposite to the third region 2c with respect to the center of the cross, and intended to be placed at the saddle of the motorcycle 1.

The regions 2a, 2b, 2c, 2d are pneumatically connected thereamong to form the member 2 and a single internal chamber 25.

More specifically, referring to FIGS. 23, 24, 25, hereinafter a preferred method for manufacturing the protection device 10, 110, 120, 130, 140, 150 will be described. For this other embodiment, members having the same function and structure keep the same reference number of the aforedescribed embodiment, and therefore will not be detailed again.

Initially, two structures 331 are provided, each including a pair of meshes 29 and 30, 329 and 330 to which there are fastened, or otherwise fixed, ends 27a, 27b of tie members 27. Each mesh 29, 30, 329, 330 has shape and sizes substantially equivalent to a respective portion 2a, 2b, 2c, 2d of the inflatable member 2 to be obtained (in FIG. 23 it is illustrated, e.g., the pair of meshes 29, 30 intended to form the third portion 2c and the pair of meshes 329, 330 intended to form the first portion 2a and the second portion 2b); moreover, the length of the tie members 27 is selected so as to determine a maximum mutual distance D between the meshes 29 and 30, 329 and 330 of each pair that be corresponding to a maximum local expansion of the respective portion of the inflatable member 2 in an inflated condition.

An edge 342 of the mesh 29 is seamed to a respective edge 343 of the mesh 329, and likewise the edges 344 and 345 of the respective opposite edges 30, 330 are seamed (seam line denoted by 346 in FIGS. 23 and 24). Thus, the pairs of meshes 29 and 329, 30 and 330 are joined therebetween, in fact obtaining a single body 331a, equipped with ties 27, having a surface equal to the sum of the surfaces of the meshes 29 and 329, or 30 and 330, respectively. It has to be noted that the ties 27 of the first pair of meshes 29 and 30 might have different lengths with respect to the ties 27 of the second pair of meshes 329 and 330, according to the respective portion of inflatable member 2 to be manufactured and its maximum thickness admitted in an inflated condition.

Along peripheral or perimetral edges 347 of the single body 331a thus obtained, the mesh 29, 329 of each pair is seamed to the respective opposite mesh 30, 330 (seam lines denoted by 348). In FIG. 23, the seaming operation is exemplified with needles 349, however it is evident that the seams 346, 348 may be machine-made, or made with other modes.

The single body 331a thus obtained is enclosed between the walls or sheets 21, 22 (FIG. 24) of soft and gas-tight material, e.g. of polyurethane or polyamide, or of the so-called laminate, having a surface extension greater than said single body 331a. In the example, the sheets 21 and 22 are glued to the respective meshes 29, 30, 329, 330 by means of polyurethane glue, utilizing a hot press 360 (which, e.g., works at temperatures of about 150° C.) to foster adhesion and mutual gluing. The peripheral edges 23, 24 of the sheets 21 and 22, at which the meshes 29, 30, 329, 330 forming the single body 331a are not enclosed, are glued the one to the other in a sealed and gas-tight manner over the entire perimeter of the sheets 21, 22 themselves. Therefore, an inflatable member 2 is obtained, which comprises both the sheets or walls 21 and 22 as an external sheath, and meshes 29 and 30, 329 and 330 internally adhering to walls 21, 22, respectively.

Optionally, referring to FIGS. 27 to 30, in the gluing step a reinforcing layer 230, made of a material like, e.g., glass fiber or Carbon fiber in a polyurethane matrix, may be arranged between a mesh 29, 30, 329, 330 and the respective sheet 21, 22; also said reinforcing layer 230 may be glued by means of polyurethane glue 231 (FIG. 28, under the action of a press 360).

Preferably, the sheets 21 and 22 exhibit a certain degree of elasticity, so as to be able to deform during an inflation and allow a differentiated expansion of the first pair of meshes 29, 30 and of the second pair of meshes 329, 330, e.g. in case those have tie members 27 of lengths different thereamong, as illustrated in FIG. 30.

Referring to FIGS. 31 to 34, it is illustrated an inflatable member 2 according to a further embodiment.

For this other embodiment, members having the same function and structure keep the same reference number of the aforedescribed embodiment, and therefore will not be detailed again.

More precisely, and as shown in FIGS. 31 to 34, the inflatable member 2 comprises at least said two walls 21, 22 made of a sheet of soft and gas-tight material, e.g. of polyamide or polyurethane, or made with the so-called laminate, which are opposed the one with respect to the other, and perimetrically fixed along the abovementioned perimetral edges 23, 24 by a sealing edge, which includes a tape 32, preferably triple-layer, comprising an adhesive layer for adhesion to wall 21, 22 of the inflatable member 2, at least one intermediate polyurethane film, and an external layer of mesh (with an anti-graze function for protecting the underlying polyurethane film).

Even more particularly, the tape 32 is folded in a longitudinal direction to form two opposed hems 33, 34. In particular, the tape 32 houses, between said opposed hems 33 and 34, the pair of overlapped edges 23, 24 of the walls 21, 22.

The hems 33, 34 of the tape 32 are seamed therebetween by one or more seam lines 35 so as to fix thereinside also the overlapped edges 23, 24 of the walls 21, 22, as illustrated in FIG. 30. A further seam line 36 is provided near the tape 32 to stably join the overlapped edges 23, 24 of the walls 21, 22 and the meshes 29, 30, prior to the fixing of the tape 32. To guarantee air tightness, the seams 35 and 36 are taped (e.g., heat-taped) according to modes substantially within the reach of a person skilled in the art.

The seams 35, 36 allow to obtain advantages similar to those described in connection to the aforedescribed seam 47.

From the above description, it emerges that the two walls 21, 22 ultimately are two members or sheets of the inflatable member 2, opposed and fixed along the respective perimetral edges 23, 24. In any case, there is nothing to prevent the two walls 21, 22 from being opposite portions of a single sheet folded book-like, and therefore having peripheral edges that extend along a portion of the perimeter and closed thereat by sealing tape.

Figure 15:
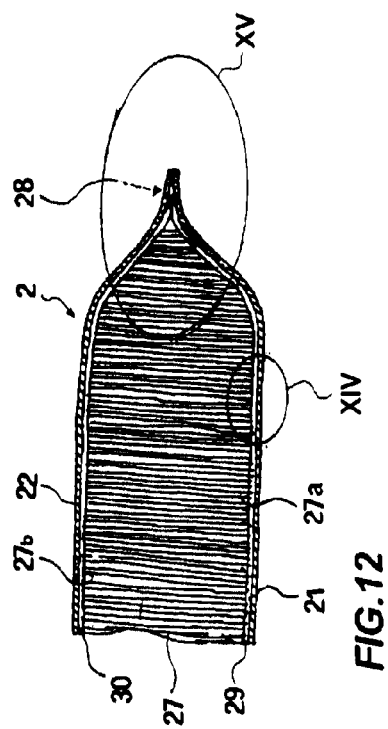
FIG. 15 shows a view of a detail XV of FIG. 12 on an enlarged scale.
Figure 14:
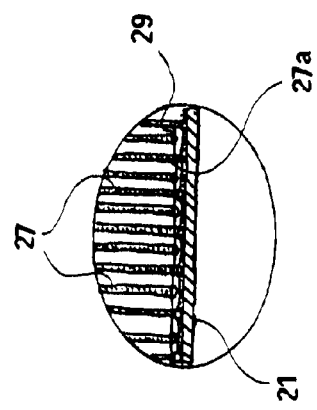
FIG. 14 shows a view of a detail XIV of FIG. 12 on an enlarged scale.

Moreover, this embodiment may be manufactured in conjunction with the aforedescribed embodiment; therefore, there is nothing to prevent the inflatable member 2 from including, besides the direct gluing of the peripheral edges 23, 24 illustrated e.g. in FIG. 15, also the tape 32 at the edge.

To carry out the inflation of the inflatable member 2, in case of road accident and/or fall and/or sliding and/or impact by a user or a vehicle 1, 100 on which he/she travels, the protection device 10, 110, 120, 130, 140, 150 according to the present disclosure is adapted to cooperate with suitable means for actuating and inflating, of which in the figures it is illustrated, merely by way of illustration, the Helium canister 60 (cold gas generator), which is arranged, e.g., inside the inflatable member 2.

Alternatively, such means may comprise generators of pyrotechnic-type or hybrid-type gas, or of other typologies known to the state of the art.

Said inflating means are controlled by a control unit on the basis of a detection of the state of the vehicle/user system; e.g., in case of a motorcycle 1, said control unit may implement a fall prediction system allowing a timely identification of a fall event and a reliable prediction thereof by means of accelerometric sensors integral to the vehicle (or to the user) and an unit for processing the signals produced by the sensors themselves.

As an alternative, the device according to the present disclosure also finds application by utilizing an actuating cable connected to the motorcycle 1, which cable actuates the inflation of the inflatable member 2 following a separation of the user from the motorcycle 1, e.g., following a fall or an impact.

In any case, the abovementioned actuating and inflating means may be integrated in the protection device 10, 110, 120, 130, 140, 150 according to the present disclosure or located externally thereto.

In case of a car 100, the inflating means are controlled by a control unit on the basis of a detection of the state of motion and of the deceleration of the car 100, e.g. according to modes already employed for the actuating of known-art airbags.

It also has to be noted that the actuation modes, though being an aspect of particular relevance for an effective operation of the device, will not be further detailed, as being methods fundamentally already known to a person skilled in the art.

The protection device 10 optionally comprises a deflation valve not shown in the drawings, communicating on one side with the internal chamber 25 and on the other side with the outside environment in order to allow deflation of the inflatable member 2 following actuation, and when a protecting action is not required anymore.

Said deflation valve, which normally is in a closed position, is e.g. manually opened by the user, in particular when, owing to a fortuitous actuation or following an impact that has entailed the actuation of the device 10, the user wishes to resume using the vehicle. In fact, owing to the pressure difference between the inflated member 2 and the outside environment, the opening up of the deflation valve causes gas to exit the internal chamber 25 and the member 2 to deflate. Tie members 27 having elastic features can assist said deflation, by pulling the respective meshes 29 and 30, 329 and 330 toward each other.

As an alternative, the actuation of the deflation valve may be controlled by an electronic control unit (not shown), which opens the deflation valve 45 when a preset time interval (e.g., 15 seconds) has elapsed from actuation of the inflating means.

According to a further embodiment, in lieu of the deflation valve a deflating cannula is utilized, having a diameter calibrated depending on the deflation time to be obtained.

The subject of the present disclosure has been hereto described with reference to preferred embodiments thereof. It is understood that other embodiments might exist, all falling within the concept of the same invention, and all comprised within the protective scope of the claims hereinafter.

The invention claimed is:

1. A protection device, comprising:
   i) an inflatable member comprising a first wall and a second wall, opposed therebetween and associated to form an internal chamber; and
   ii) one or more structures housed in said internal chamber, each of said one or more structures comprising a first mesh and a second mesh opposed therebetween and connected by a plurality of tie members, wherein said first mesh is associated with the first wall and said second mesh is associated with the second wall,
   wherein each of said first wall and second wall is a laminate comprising a first layer and a second layer, said first layer being a fabric layer and said second layer being a glue layer,
   wherein said protection device is adapted to protect a user of a vehicle and is adapted to be associated with said vehicle.

2. The protection device according to claim 1, wherein said tie members are flexible tie members.

3. The protection device according to claim 1, wherein said tie members are thread-shaped members.

4. The protection device according to claim 1, wherein each tie member of said plurality of tie members has a first end continuously interlaced with either said first mesh or said second mesh and a second end continuously interlaced with the other mesh.

5. The protection device according to claim 1, wherein the first mesh and second mesh are joined therebetween in direct contact along perimetral edges.

6. The protection device according to claim 1, comprising a perimetral seam directly connecting said first mesh with said second mesh.

7. The protection device according to claim 1, wherein said first wall has a surface extension greater than the first mesh and said second wall has a surface extension greater than the second mesh, and wherein peripheral edges of said first wall and said second wall, projecting respectively from the first mesh and from the second mesh, are sealingly joined therebetween.

8. The protection device according to claim 1, wherein a first glue layer is interposed between said first mesh and said first wall and a second glue layer is interposed between said second mesh and said second wall.

9. The protection device according to claim 8, wherein said first glue layer, on one side, adheres to the second layer of the first wall and, on the other side, penetrates into respective pores of the first mesh, and wherein said second glue layer, on one side, adheres to the second layer of the second wall and, on the other side, penetrates into respective pores of the second mesh.

10. The protection device according to claim 1, wherein a plurality of said one or more structures are connected thereamong to form a single construction, wherein the plurality of said one or more structures are housed in the internal chamber.

11. The protection device according to claim 1, further comprising a reinforcing layer associated to a respective portion of said inflatable member, wherein said reinforcing layer is interposed between either said first mesh and said first wall or said second mesh and said second wall.

12. The protection device according to claim 1, further comprising means for actuating and/or inflating said inflatable member.

13. A vehicle comprising a housing and the protection device according to claim 1, said protection device being arranged in said housing.

14. The protection device according to claim 1, wherein said fabric layer is a nylon layer.

15. A method for manufacturing a protection device, wherein said protection device is adapted to protect a user of a vehicle and is adapted to be associated to said vehicle, wherein the method comprises the steps of
   i) providing a first wall and a second wall and arranging them in a spaced apart relationship to form an internal chamber;
   ii) housing in the internal chamber a structure, wherein the structure comprises a first mesh and a second mesh opposed there between and connected by a plurality of tie members, the structure comprising the first mesh, the second mesh and the tie members being located between the first wall and the second wall;
   iii) associating said first mesh to the first wall and said second mesh to the second wall; and
   iv) perimetrically connecting said first wall and second wall,
wherein each of said first wall and second wall is a laminate comprising a first layer and a second layer, wherein said first layer is a fabric layer and said second layer is a glue layer.

16. The method according to claim 15, further comprising a step of including a first glue film between said first mesh and said first wall and a second glue film between said second mesh and said second wall.

17. The method according to claim 16, wherein the second layer of the first wall is bound to said first glue film and the second layer of the second wall is bound to said second glue film.

18. The method according to claim 15, further comprising, prior to housing said structure in the internal chamber between said first wall and second wall, perimetrically fixing said first mesh in direct contact with the second mesh.

19. The method according to claim 15, further comprising, prior to housing said structure in the internal chamber between said first wall and second wall, peripherally seaming said first mesh with the second mesh.

20. The method according to claim 15, wherein said first wall and said second wall are made so that said first wall has a surface extension greater than the first mesh and said second wall has a surface extension greater than the second mesh, and wherein peripheral edges of said first wall and second wall are projecting respectively from each of said first mesh and second mesh and are sealingly joined therebetween.

* * * * *

UNITED STATES PATENT AND TRADEMARK OFFICE
CERTIFICATE OF CORRECTION

PATENT NO.         : 8,608,191 B2                                                                 Page 1 of 1
APPLICATION NO.    : 13/133437
DATED              : December 17, 2013
INVENTOR(S)        : Dainese et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 87 days.

Signed and Sealed this
Twenty-second Day of September, 2015

Michelle K. Lee
*Director of the United States Patent and Trademark Office*